(12) United States Patent
Sun

(10) Patent No.: US 12,293,581 B2
(45) Date of Patent: May 6, 2025

(54) INFORMATION PUSHING METHOD IN VEHICLE DRIVING SCENE AND RELATED APPARATUS

(71) Applicant: Tencent Technology (Shenzhen) Company Limited, Guangdong (CN)

(72) Inventor: Zhongyang Sun, Guangdong (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 113 days.

(21) Appl. No.: 17/952,466

(22) Filed: Sep. 26, 2022

(65) Prior Publication Data

US 2023/0013451 A1    Jan. 19, 2023

Related U.S. Application Data

(63) Continuation of application No. PCT/CN2022/073344, filed on Jan. 24, 2022.

(30) Foreign Application Priority Data

Feb. 4, 2021 (CN) .......................... 202110155620.2

(51) Int. Cl.
    *G06V 20/40*    (2022.01)
    *G06T 7/70*     (2017.01)
    (Continued)

(52) U.S. Cl.
    CPC ............... *G06V 20/41* (2022.01); *G06T 7/70* (2017.01); *G06V 10/44* (2022.01); *G06V 20/50* (2022.01);
    (Continued)

(58) Field of Classification Search
    CPC ........ G06V 20/41; G06V 10/44; G06V 20/50; G06V 2201/07; G06V 20/70; G06V 20/56;
    (Continued)

(56) References Cited

U.S. PATENT DOCUMENTS 9,487,139 B1 * 11/2016 Ishida .................. B60W 30/08
2017/0076597 A1 * 3/2017 Beattie, Jr. ........... G08G 1/0962
(Continued)

FOREIGN PATENT DOCUMENTS

CN         107306281      10/2017
CN         109936664       6/2019
(Continued)

OTHER PUBLICATIONS

International Search Report issued Apr. 20, 2022 in International (PCT) Application No. PCT/CN2022/073344.
Office action issued in Chinese application No. 202110155620.2, dated Nov. 18, 2024, 15 pages (with English translation).
Office action issued in Chinese application No. 202110155620.2, dated Aug. 23, 2024, 17 pages (with English Translation).

*Primary Examiner* — Alazar Tilahun

(74) *Attorney, Agent, or Firm* — Crowell & Moring LLP

(57) ABSTRACT

This disclosure relates to an information pushing method in a vehicle driving scene. The method may include receiving push information in the vehicle driving scene and obtaining driving scene image information collected by an in-vehicle image collection device. The method may further include identifying scene category identification information based on the driving scene image information. The scene category identification information is for indicating a category of the environmental information. The method may further include pushing, in response to the scene category identification information satisfying a push condition, the push information in the vehicle driving scene.

18 Claims, 10 Drawing Sheets

(51) Int. Cl.
*G06V 10/44* (2022.01)
*G06V 20/50* (2022.01)
*H04L 67/55* (2022.01)

(52) U.S. Cl.
CPC .... *H04L 67/55* (2022.05); *G06T 2207/20132* (2013.01); *G06T 2207/30252* (2013.01); *G06V 2201/07* (2022.01)

(58) Field of Classification Search
CPC .. G06V 20/588; G06V 20/582; G06V 40/103; G06V 2201/08; G06V 20/58; G06V 20/38; G06T 7/70; G06T 2207/20132; G06T 2207/30252; G06T 7/50; G06T 2207/20084; G06T 2207/30236; G06T 2207/30256; H04L 67/55; H04L 67/12; G06F 16/9537
See application file for complete search history.

(56) References Cited

U.S. PATENT DOCUMENTS

| | | | |
|---|---|---|---|
| 2019/0137622 A1* | 5/2019 | Lopez-Hinojosa | G01S 13/867 |
| 2019/0318267 A1 | 10/2019 | Zhang et al. | |
| 2020/0143175 A1* | 5/2020 | Tan | G06T 7/50 |
| 2021/0201049 A1* | 7/2021 | Su | G06F 18/2411 |

FOREIGN PATENT DOCUMENTS

| | | |
|---|---|---|
| CN | 109961792 A | 7/2019 |
| CN | 110060477 | 7/2019 |
| CN | 111010545 A | 4/2020 |
| CN | 111131422 | 5/2020 |
| WO | WO 2019128552 A1 | 7/2019 |

* cited by examiner

INFORMATION PUSHING METHOD IN VEHICLE DRIVING SCENE AND RELATED APPARATUS

RELATED APPLICATION

This application is a continuation application of PCT Patent Application No. PCT/CN2022/073344, filed on Jan. 24, 2022, which claims priority to Chinese Patent Application No. 202110155620.2, filed with the China National Intellectual Property Administration on Feb. 4, 2021 and entitled "INFORMATION PUSHING METHOD IN VEHICLE DRIVING SCENE AND RELATED APPARATUS", wherein the content of each of the above-referenced applications is incorporated herein by reference in its entirety.

FIELD OF THE TECHNOLOGY

This disclosure relates to the technical field of computers, and in particular to information pushing in a vehicle driving scene.

BACKGROUND OF THE DISCLOSURE

With the rapid development of Internet technologies, more and more application programs appear in people's lives. For example, while driving, a user can use an in-vehicle application to receive map information and related communication information.

In the related art, messages are pushed during driving by means of instant push of information. For example, information received by different applications is pushed in the vehicle driving process according to a chronological order in which it is received.

SUMMARY

In view of this, this disclosure provides an information pushing method in a vehicle driving scene, which can effectively improve the information pushing efficiency in the vehicle driving scene and the safety during driving.

In one aspect, an embodiment of this disclosure provides an information pushing method in a vehicle driving scene, which may be applied to a system or program that includes an information pushing function in a vehicle driving scene in a terminal device. The method specifically includes:
  receiving push information in the vehicle driving scene;
  obtaining driving scene image information collected by an in-vehicle image collection device, the driving scene image information being for recording corresponding environmental information of a vehicle in the vehicle driving scene;
  identifying scene category identification information based on the driving scene image information, the scene category identification information being for indicating a category of the environmental information; and
  pushing, in response to the scene category identification information satisfying a push condition, the push information in the vehicle driving scene.

In another aspect, an embodiment of this disclosure provides an information pushing apparatus, and the apparatus includes a memory operable to store computer-readable instructions and a processor circuitry operable to read the computer-readable instructions. When executing the computer-readable instructions, the processor circuitry is configured to:
  receive push information in the vehicle driving scene;
  obtain driving scene image information collected by an in-vehicle image collection device, the driving scene image information being for recording corresponding environmental information of a vehicle in the vehicle driving scene;
  identify scene category identification information based on the driving scene image information, the scene category identification information being for indicating a category of the environmental information; and
  push, in response to the scene category identification information satisfying a push condition, the push information in the vehicle driving scene.

In still another aspect, an embodiment of this disclosure provides a non-transitory machine-readable media storing instructions. When being executed, the instructions is configured to cause a machine to:
  receive push information in the vehicle driving scene;
  obtain driving scene image information collected by an in-vehicle image collection device, the driving scene image information being for recording corresponding environmental information of a vehicle in the vehicle driving scene;
  identify scene category identification information based on the driving scene image information, the scene category identification information being for indicating a category of the environmental information; and
  push, in response to the scene category identification information satisfying a push condition, the push information in the vehicle driving scene.

According to the foregoing technical solutions, it can be learned that the embodiments of this disclosure have the following advantages:

If the push information in the vehicle driving scene is received, obtain the driving scene image information collected by the in-vehicle image collection device, the driving scene image information is used for recording the corresponding environmental information of the vehicle in the vehicle driving scene, and the scene category identification information identified based on the driving scene image information can be obtained. Since the scene category identification information is used for indicating the category of the environmental information, if the scene category identification information satisfies the push conditions, then the push information is pushed in the vehicle driving scene. In this way, the scene where the driving object is located is identified, and further the information is pushed in a suitable scene intelligently. Therefore, a user can accurately perceive the pushed information upon information pushing, which greatly improves the information pushing efficiency, and moreover, the attention distracted by the pushed information will not affect the safety of the user during driving.

DESCRIPTION OF EMBODIMENTS

Embodiments of this disclosure provide an information pushing method in a vehicle driving scene and a related apparatus. With the method and apparatus, a user can accurately perceive pushed information, which greatly improves the information pushing efficiency, and moreover, the attention distracted by the pushed information will not affect the safety of the user during driving.

In the specification, claims, and accompanying drawings of this disclosure, the terms "first", "second", "third", "fourth", and the like (if existing) are intended to distinguish between similar objects rather than describe a specific sequence or a precedence order. It may be understood that the data termed in such a way is interchangeable in proper circumstances, so that the embodiments of this disclosure described herein for example, can be implemented in other orders than the order illustrated or described herein. In addition, the terms "include", "corresponding to" and any other variants are intended to cover the non-exclusive inclusion. For example, a process, method, system, product, or device that includes a series of steps or units is not necessarily limited to those expressly listed steps or units, but may include other steps or units not expressly listed or inherent to such a process, method, product, or device.

First, terms possibly appearing in the embodiments of this disclosure are explained.

In-vehicle vision assistant: refers to an application program for identifying the driving environment in the vehicle scene, and specifically can control information pushing in the vehicle scene according to the driving environment identification result.

External environment perception: refers to a process of classifying collected images by means of deep learning using the images captured by the in-vehicle camera.

In-vehicle camera: the in-vehicle camera here includes a driving recorder camera located at the upper part of the middle of the windshield of the vehicle, a 360-degree panoramic camera around the vehicle body or other cameras that can film the environment around the vehicle.

Figure 1:
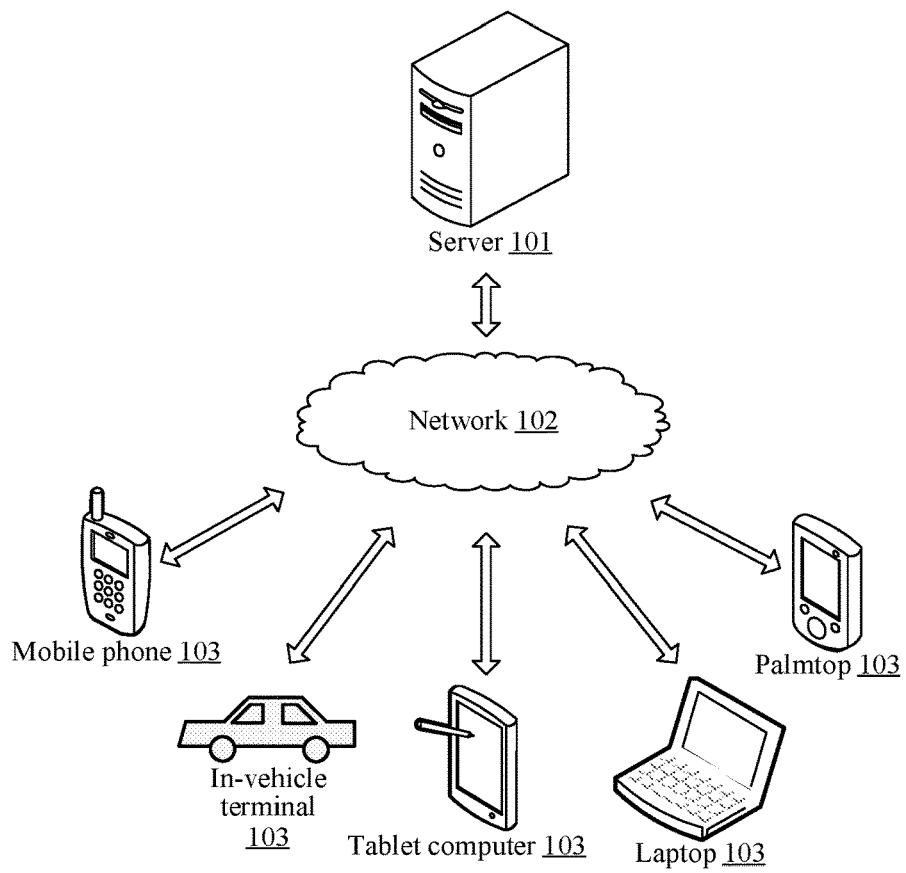
FIG. 1 is a network architecture diagram showing operation of an information pushing system in a vehicle driving scene.

It is to be understood that the information pushing method in a vehicle driving scene provided by this disclosure can be applied to a system or program in which the terminal device includes an information pushing function in the vehicle driving scene, for example, the in-vehicle vision assistant. Specifically, the information pushing system in the vehicle driving scene can run in the network architecture shown in FIG. 1. FIG. 1 is a network architecture diagram showing operation of an information pushing system in a vehicle driving scene. As can be seen from the figure, the information pushing system in the vehicle driving scene can provide an information pushing process in the vehicle driving scene among a plurality of information sources. That is, a terminal device receives a push instruction issued by a server and displays pushed information in a driving object, and the process of displaying the pushed information is determined by the scene where the driving object is located. It is to be understood that a variety of terminal devices are shown in FIG. 1. The terminal device may be a computer device. However, in the actual scene, there may be more or fewer types of terminal devices participating in the information pushing process in the vehicle driving scene, and the specific number and type depend on the actual scene and are not limited here. In addition, one server 101 is shown in FIG. 1, but in the actual scene, there may be a plurality of servers, and the specific number of servers depends on the actual scene.

In this embodiment, the server 101 may be an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, a content delivery network (CDN), big data, and an artificial intelligence platform. The terminal 103 may be a smartphone, a tablet computer, a notebook computer, a desktop computer, a smart speaker, a smartwatch, or the like, but is not limited thereto. The terminal 103 and the server 101 may be directly or indirectly connected in a wired or wireless communication manner, and the terminal and the server may be connected to form a blockchain network 102. This is not limited in this disclosure.

It is to be understood that the above information pushing system in the vehicle driving scene may operate in a mobile terminal, for example, as an application such as the in-vehicle vision assistant, or may operate in a server, or may operate in a third-party device to push information in the vehicle driving scene, so as to obtain processing results of pushed information in the vehicle driving scene from the information source. Specifically, the information pushing system in a vehicle driving scene may operate in the above devices in the form of a program, or operate as a system component in the above devices, or operate as a cloud service program, and the specific operation mode depends on the actual scene and is not limited here.

In the related art, messages are pushed instantly in the driving process. In the driving process, many scenes require the user to focus on the operation of the driving object, so that the user cannot pay attention to the information pushed instantly all the time, and thus may miss some information.

Moreover, checking the pushed information may distract the attention of the user as a driver and affect the information pushing efficiency in the vehicle driving scene and the safety of the user during driving.

To resolve the foregoing problem, this disclosure provides an information pushing method in a vehicle driving scene. The method uses a computer vision (CV) technology to resolve the problem. The CV is a science that studies how to use a machine to "see", and furthermore, is machine vision that a camera and a computer are used for replacing human eyes to perform recognition, tracking, measurement, and the like on a target, and further perform graphic processing, so that the computer processes the target into an image more suitable for human eyes to observe, or an image transmitted to an instrument for detection. As a scientific subject, the CV studies related theories and technologies, and attempts to establish an AI system that can obtain information from images or multidimensional data. The CV technologies generally include technologies such as image processing, image recognition, image semantic understanding, image retrieval, optical character recognition (OCR), video processing, video semantic understanding, video content/behavior recognition, three-dimensional object reconstruction, a 3D technology, virtual reality, augmented reality, synchronous positioning, and map construction, and further include biological feature recognition technologies such as common face recognition and fingerprint recognition.

Meanwhile, machine learning (ML) is used in an application process of the CV technology. The ML is a multi-field interdisciplinary subject involving the probability theory, statistics, the approximation theory, convex analysis, the algorithm complexity theory, and the like. The ML specializes in studying how a computer simulates or implements a human learning behavior to obtain new knowledge or skills, and reorganize an existing knowledge structure, so as to keep improving its performance. The ML is the core of the AI, is a basic way to make the computer intelligent, and is applied to various fields of AI. The ML and DL generally include technologies such as an artificial neural network, a belief network, reinforcement learning, transfer learning, inductive learning, and learning from demonstrations.

Figure 2:
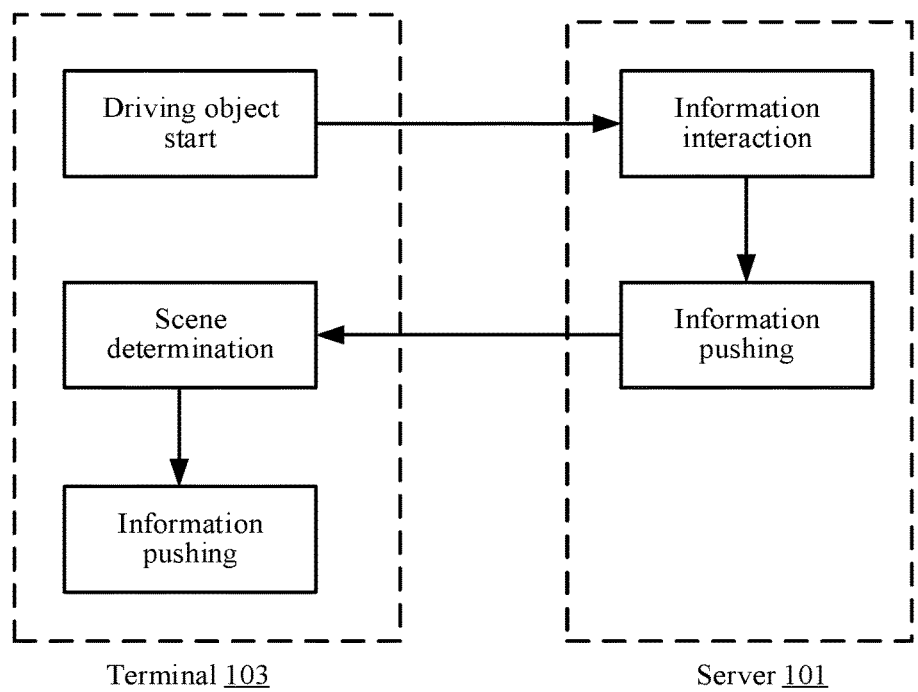
FIG. 2 is a flow architecture diagram of information pushing in a vehicle driving scene according to an embodiment of this disclosure.

Specifically, the method is applied to a flow framework of information pushing in a vehicle driving scene as shown in FIG. 2. FIG. 2 is a flow architecture diagram of information pushing in a vehicle driving scene provided by an embodiment of this disclosure. That is, the external environment is identified according to the collected image at the terminal side, so as to perform information interaction and pushing with the server side, so that non-urgent services and messages are sent together to the driver when the driver is less burdened in driving (for example, when waiting for the traffic light). This not only reduces the driving safety problem when the driver is distracted by the pushed messages, but also increases the probability of push reaching to the user.

It is to be understood that the method provided by this disclosure may be written as a program to be used as a processing logic in a hardware system, or may be used as an information pushing apparatus that implements the above processing logic in an integrated or external manner.

Figure 3:
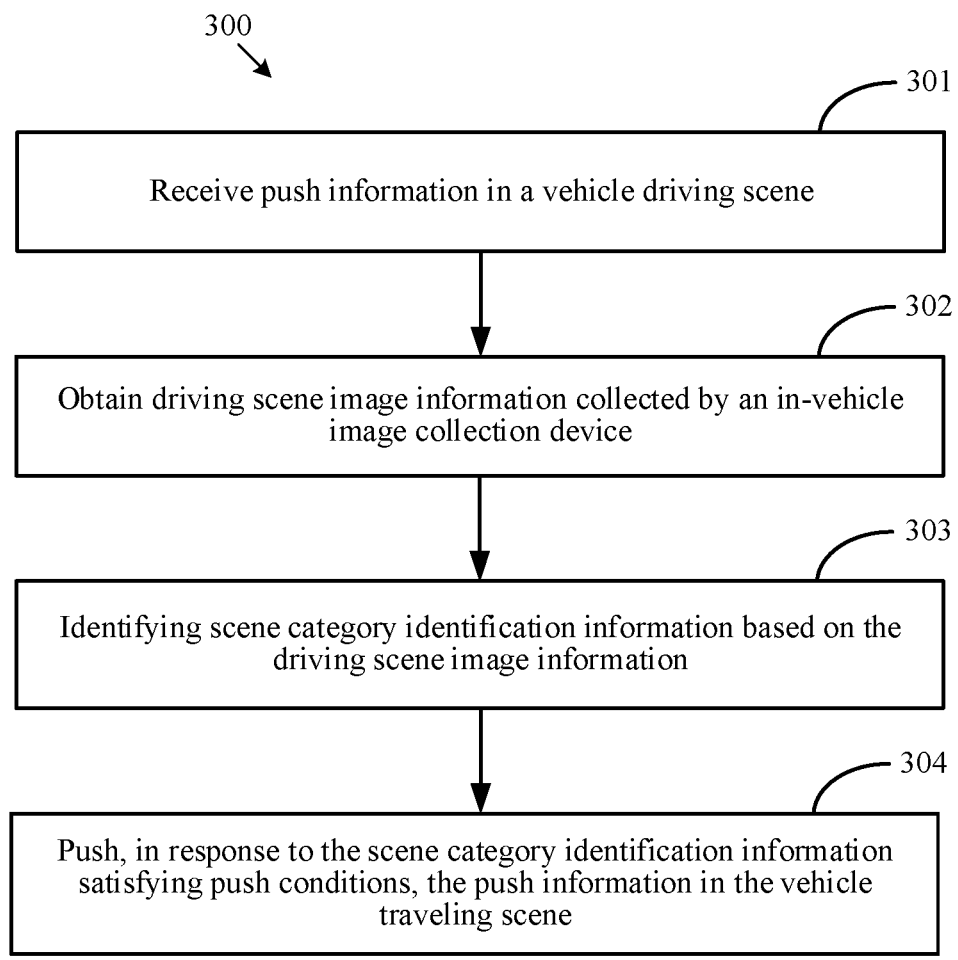
FIG. 3 is a flowchart of an information pushing method in a vehicle driving scene according to an embodiment of this disclosure.

The solutions provided in the embodiments of this disclosure relate to technologies such as CV of AI, and are specifically described by using the following embodiments:

In combination with the above flow architecture, an information pushing method in a vehicle driving scene in this disclosure will be introduced below. Referring to FIG. 3, FIG. 3 is a flowchart of an information pushing method 300 in a vehicle driving scene provided by an embodiment of this disclosure. The pushing method 300 may be executed by a terminal device. The method 300 provided by the embodiments of this disclosure at least includes the following steps:

301: Receive push information in a vehicle driving scene.

In this embodiment, the push information may include one or more of session messages, application messages and navigation messages. The push information received in a driving object is a set of information received by a terminal device in the driving object. The terminal device corresponds to a target user, so the push information may be received messages, for example, the push of a program logged in by the user (video website, music application, communication application and the like); or short messages of an IM for in-vehicle communication; or messages generated by the vehicle itself; or navigation information, such as lane departure warning, prompts for start of in-front vehicle, recommendation of destination parking lot and the like. The specific information form is determined according to the actual scene.

It is to be understood that for a plurality of pieces of push information that are received, there may be information that needs to be pushed instantly, such as navigation information, safety prompts and the like, and therefore, the type of the information may be determined, that is, the information type corresponding to the push information may be obtained at first. If the information type indicates that the push information is information that needs to be pushed instantly, the push information is pushed immediately, thereby ensuring the normal guidance for the driving process.

In a scene, messages that need to be pushed to the user immediately may include lane deviation warning, prompts for start of in-front vehicle and other messages with great immediacy or importance. Commercial messages that are classified as information that does not need to be pushed immediately but needs to be viewed for a long time, such as membership activities of audiobook applications and recently released movies in China in movie review applications, may be pushed together at a certain time.

In some implementations, the information type that needs to be pushed immediately may be preset, that is, in response to permission setting information, preset push types may be determined as the information that needs to be pushed instantly. If the information type indicates that the push information is the preset push type, then the push information is pushed immediately, thereby enhancing the information pushing flexibility and facilitating the user's control and use.

302: Obtain driving scene image information collected by an in-vehicle image collection device.

In this embodiment, the driving scene image information is used for recording corresponding environmental information of the vehicle in the vehicle driving scene, i.e., recording environmental information in the vehicle driving process in real time. The process of collecting image information may be executed by a collection device in the vehicle, for example, an in-vehicle camera, a driving recorder and the like.

Figure 4:
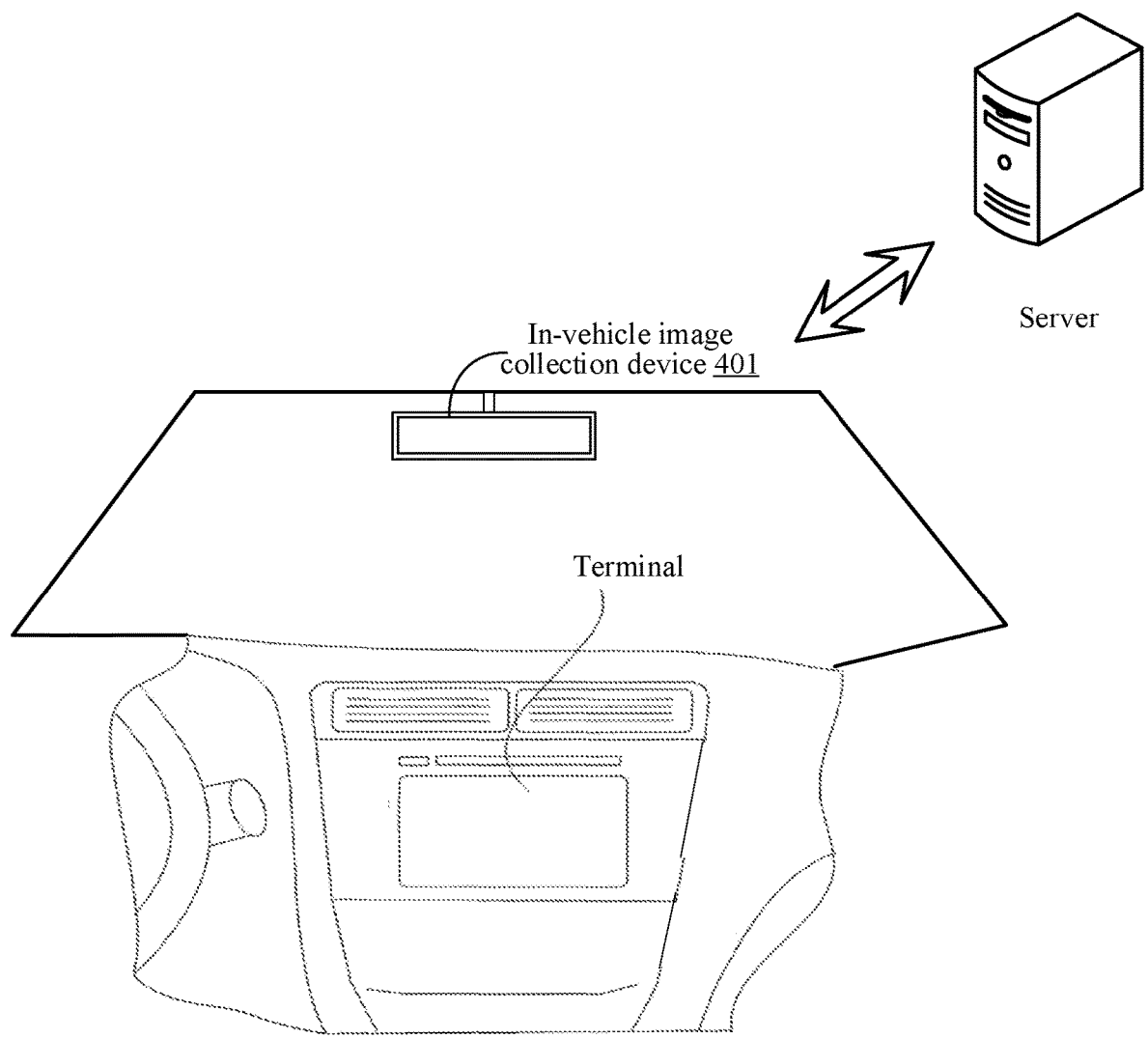
FIG. 4 is a schematic scene diagram of an information pushing method in a vehicle driving scene according to an embodiment of this disclosure.

In an implementation, as shown in FIG. 4, FIG. 4 is a schematic scene diagram of an information pushing method in a vehicle driving scene provided by an embodiment of this disclosure. The figure shows an interactive interface for information interaction and an in-vehicle image collection device 401, for example, a driving recorder, and the driving recorder is equipped with an in-vehicle camera to collect vehicle environment images.

It is to be understood that for the specific hardware composition, the interactive interface may be integrated in the recorder, or the recorder is integrated in the interactive interface, for example, a mobile terminal, the mobile terminal may be connected to the in-vehicle image collection device via Bluetooth or wireless hotspots. The specific hardware composition is determined according to the actual scene and is not limited here.

Specifically, in the image information collection process, it is required to ensure the accuracy of the information, so that collection parameters may be called in response to a target instruction. The collection parameters are set based on the driving scene, and the target instruction may be a user's instruction for enabling information push control or an instruction for enabling the collection device. Then, image collection is performed according to the collection parameters to obtain a collected image. Further, the collected image is preprocessed to obtain driving scene image information, so that a clear scene image can be obtained, thereby ensuring the accuracy of the image identification process.

In some implementations, the collection device in the vehicle may collect relevant image elements of the vehicle itself, and these elements may be deleted to reduce the data volume. That is, firstly, the collected image is preprocessed to determine a driving object element in the collected image. Then the driving object element is cropped out to obtain a cropped image. Further, parameters of the cropped image are adjusted to obtain the driving scene image information.

In a scene, the process of preprocessing the collected image may include: for example, scale the collected image to use a smaller network model that is more suitable to be mounted in the vehicle; or crop the collected image, such as crop out an engine cover and other areas unrelated to the air quality outside the vehicle; or enhance the collected image, such as increase the contrast, perform histogram equalization or normalization and the like. The specific preprocessing process may be any one or a combination of more of the above, and is not limited here.

303: Obtain scene category identification information identified based on the driving scene image information.

Since the driving scene image information is used for recording the corresponding environmental information of the vehicle in the vehicle driving scene, the current corresponding scene category information can be identified based on the recorded environmental information. The scene category identification information is used for indicating a category of the environmental information.

This disclosure does not limit an execution subject that determines the scene category identification information, which may be the aforementioned terminal device or may be a server having a network connection with the terminal device. For example, when the terminal device has sufficient data processing capability, the scene category identification information can be determined by the terminal device. For example, in a case with a good network transmission speed, such as a 5G network environment, the terminal device may transmit the driving scene image information to the serve, and the server determines the scene category identification information and provides the scene category identification information to the terminal device. This disclosure does not limit the implementation conditions for using the terminal device or the server to identify the scene category identification information. The above method of selecting the terminal device or the server based on the network status is merely exemplary, and the execution subject for identifying the scene category identification information may be determined based on other conditions such as processing capability.

In an implementation, step 303 includes:

3031: Transmit the driving scene image information to a server such that the server identifies the driving scene image information to obtain the scene category identification information.

3032: Receive the scene category identification information transmitted by the server.

In this embodiment, the server may identify the driving scene image information based on fixed features, such as sign boards, traffic lights and the like; or may identify the driving scene image information by inputting the driving scene image information into a first model. The first model is an image identification model, and an identification result of the model is used for scene classification, so this model may also be called an image classification model. Specifically, the model may be VGG16, VGG19, InceptionV3, Xception, MobileNet, AlexNet, LeNet, ZF Net, ResNet18, ResNet34, ResNet50, ResNet_101, ResNet_152 or other image classification models. The specific type of the model is determined according to the actual scene.

In some implementations, the identification result obtained through the first model may be attribution probabilities of different scenes. That is, image information is inputted into a local preset model of the terminal device to obtain a scene score sequence, and the scene score sequence is used for indicating attribution probabilities of a plurality of preset scenes. Then, a target item in the scene score sequence is determined based on the attribution probability, and the image information is identified to obtain the scene category corresponding to the driving scene. For example, if the attribution probability of a parking lot scene is 0.9 and the attribution probability of a traffic jam scene is 0.8, then the parking lot scene is determined as the scene category.

In some implementations, the process of determining the scene category may also be a binary classification process, that is, the outputted result is suitable for information pushing or is not suitable for information pushing. Specifically, firstly, the target item in the scene score sequence is determined based on the attribution probability. Then a push category, for example whether the information can be pushed or not, corresponding to the target item is determined. Further, the scene category corresponding to the driving scene is determined according to the push category, so that the push determination efficiency is improved.

In a scene, the above identification process by the model includes: input the image into a classification model with discrete outputs (for example, the first model, a second model or the preset model), and the output contents are detailed scenes shown in the captured content, such as traffic jam, cloudy day, rainy day, tunnel, underground parking lot and the like, or just a binary result, such as whether it is suitable for pushing messages.

In some implementations, the identification process may also be executed by the terminal device, for example, when the network is unstable. Specifically, network resource information, such as data usage of mobile terminal, network latency and the like, may be obtained in real time. Then, network status information is determined based on the network resource information, for example, the network status information is determined based on the numerical relationship between the network resource information and a preset value, for example, whether the data usage exceeds 80% or the network latency is less than 100 ms. If the network status information satisfies preset conditions, the driving scene image information is transmitted to the server such that the server inputs the driving scene image information into the first model and identifies the driving scene image information to obtain the scene category identification information.

In the identification process by the server, the driving scene image information is transmitted to the server, such that the server inputs the image information into the first model and obtains the scene score sequence, the scene score sequence is used for indicating attribution probabilities of a plurality of preset scenes; and then the scene category corresponding to the driving scene transmitted by the server is received, and the scene category is determined according to a target item in the scene score sequence for indicating the attribution probabilities of the plurality of preset scenes.

In a scene, the first model may be in the structure of MobileNet V3. The MobileNetV3 is constructed based on AutoML, and then manual fine-tuning is performed to optimize the search results. The search method adopts platform-aware NAS and NetAdapt, which are respectively used for global search and local search. The manual fine-tuning adjusts the structure of front and rear layers of the network, adds an SE module to bottleneck and proposes computationally efficient h-swish nonlinear activation. In terms of model structure, the difference between multiclass classification and binary classification of the first model with discrete outputs lies in the number of categories finally outputted. That is, the multiclass classification can classify a scene into one or more categories at the same time, such as rainy day and rainy day+traffic jam, and the binary classification can only output whether it is a certain scene. The specific category form depends on the actual scene.

In a scene where the model is mounted in the terminal device, i.e., if the network status information does not satisfy the preset conditions, the second model is called to extract local features from the driving scene image information to obtain feature elements. The second model occupies less computing resources than the first model, that is, the second model is a lightweight model. Then, identification is performed based on the feature elements to obtain a feature category, for example, a current road category is determined by identifying the lane lines, and when the lane lines include double solid lines, it indicates that the vehicle is in a road scene and it is not suitable for information pushing. Further, the scene category identification information is determined according to the scene information corresponding to the feature category. Since the second model performs local identification on the driving scene image information, such as identification of lane lines and identification of sign boards, so that the data processing amount is reduced. As a result, the second model is suitable to be mounted in an in-vehicle device for identification, which ensures the identification accuracy under poor network conditions.

It is to be understood that the lightweight model mounted in the vehicle or mobile terminal may perform calculations by depth separable convolution or channel shuffle. The depth separable convolution includes processes of depthwise convolution and pointwise convolution. In the depthwise convolution, one convolution kernel is responsible for one channel, and one channel is only convolved by one convolution kernel. The number of channels of a feature map generated in this process is exactly the same as the number of channels inputted. Therefore, the lightweight model can achieve better detection results with a smaller amount of calculation. In an actual scene, model pruning and quantization can be performed in combination with arm assembly to accelerate a hardware platform on the terminal side.

Specifically, the lightweight model (the second model) may be an in-vehicle lane line model, which specifically uses MobileNet series or Shuffle Net as the frontend, and a simplified yolo or a full convolutional layer with skip connections as the backend to make the model lightweight.

In some implementations, the identification process by the terminal side may be performed based on the second model or performed based on the first model. Specifically, the model on the terminal side may be mounted in the in-vehicle image collection device or mounted in the mobile terminal, and the specific form depends on the specific scene.

In this embodiment, the scene category identification information is used for indicating the category of the environmental information, which may specifically include the scene type corresponding to the environmental information of the driving scene, or the climate type where the vehicle driving scene is located, or the push type corresponding to the vehicle driving scene (for example, whether to push the information).

In an implementation, the scene category identification information transmitted by the server may be received instantly, that is, once the server obtains the scene category identification information, it is immediately transmitted such that the terminal can receive it. The scene category identification information transmitted by the server may also be received intermittently. Since the vehicle stays in each scene for a certain time, in order to save channel resources, the scene category identification information may be transmitted periodically.

304: Push, when the scene category identification information satisfies push conditions, the push information in the vehicle driving scene.

In this embodiment, the scene category identification information satisfying the push conditions means that the driver is in an idle state or a waiting state in this scene, which indicates a scene of a non-driving state. The information pushed in this scene may avoid affecting the normal driving process, and also ensure the reach rate of information to the user, thereby improving the information pushing efficiency.

Specifically, the scene category identification information may include a driving environment category and a weather environment category, and the scene category identification information that satisfies the push conditions includes a scene where the driving environment category indicates that the vehicle is in safe driving or in a scene of stopping driving; or a weather scene where the weather environment category indicates that the driving of the driving object is not affected.

In some implementations, in addition to the determination on the scene, the determination on whether to push or not may also be performed in combination with the current specific driving process. That is, when the scene category satisfies the push conditions, statistics on driving parameters of the vehicle in a preset time period, such as the average vehicle speed in the past 5 minutes, are gathered, so as to avoid the influence of instantaneous speed changes on the determination of the push conditions. Then, push parameters are determined based on numerical fluctuations corresponding to the driving parameters, that is, the information is pushed when the fluctuations are gentle and the average vehicle speed is low. Further, a push sequence list is generated according to the push parameters to push the push information based on the push sequence list. By setting the push sequence list, the timing for pushing the information is digitized, thereby ensuring the accuracy of push timing.

In a scene, when the scene category identification information outputted by the model is an underground parking lot and the driving parameters show a zero vehicle speed, or when the scene category identification information outputted by the model is a traffic jam and the driving parameters show that the average vehicle speed within a period of time is less than a certain threshold, it is suitable for pushing information. When the scene category identification information outputted by the model is a tunnel and the driving parameters show a high vehicle speed, it is not suitable for pushing information.

Figure 5:
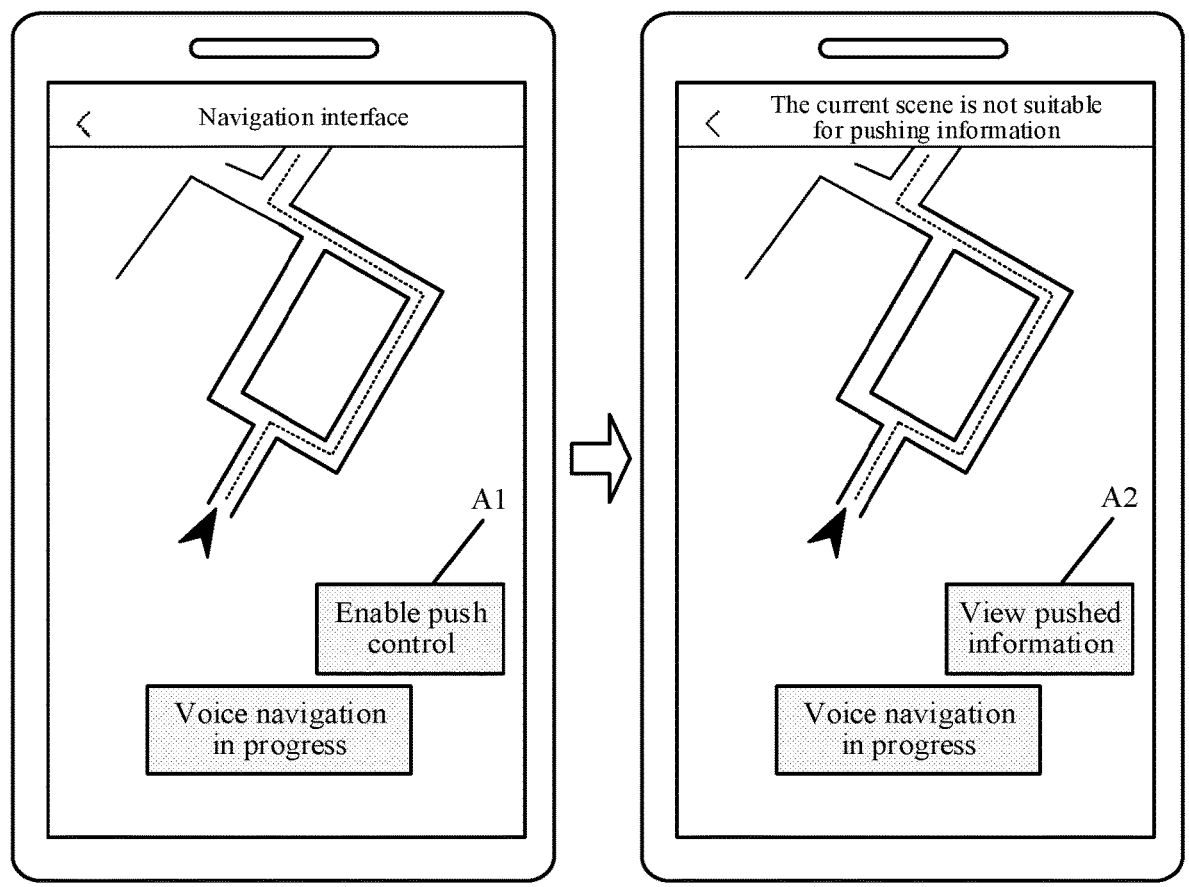
FIG. 5 is a schematic scene diagram of another information pushing method in a vehicle driving scene according to an embodiment of this disclosure.

Specifically, as shown in FIG. 5, FIG. 5 is a schematic scene diagram of another information pushing method in a vehicle driving scene provided by an embodiment of this disclosure. The figure shows a navigation interface of the terminal. When the user clicks/taps "Enable push control" A1, the push process of the above embodiment is executed, "Push information or not in the current scene" is displayed on the navigation interface, and the user may click/tap "View pushed information" A2 when idle and then view the push information list.

It is to be understood that some timings that are particularly not suitable for pushing are distinguished based on the above embodiment, so that the messages may not be pushed when it is not suitable for pushing, and may be pushed during the rest of time.

Further, in order to ensure the identification accuracy of the scene category, statistics on results of a plurality of frames may be gathered. That is, firstly, a scene category set outputted by the first model within a preset time period is obtained. The scene category set is a plurality of pieces of historical scene category identification information outputted by the first model within the preset time period.

The preset time period may be a fixed time period, or may be a time period corresponding to a certain number of frames. Then, statistics on category distribution information of scene categories identified by the plurality of pieces of historical scene category identification information in the scene category set, i.e. a set of categories corresponding to different frames, are gathered. Finally, the scene category identification information is updated based on an extreme value item in the category distribution information, for example, updated to the scene category corresponding to the frame with the most votes. If the updated scene category identification information satisfies the push conditions, then statistics on the driving parameters of the vehicle within the preset time period are gathered, thereby avoiding the influence on the scene category identification results caused by instantaneous scene changes, and enhancing the robustness of the scene identification process.

In a scene, the classification model (the first model, the second model or the preset model) may vote on the outputs of the driving scene image information of the nearest x frames and determines the current scene according to the majority principle, thereby avoiding the outlier interference and ensuring the accuracy of scene identification.

In another scene, when a plurality of applications receive push information, the push information may be cached in a push pool. That is, in response to receiving the push information in the driving object, an information type corresponding to the push information is obtained. If the information type indicates that the push information is non-instant information, the push information is inputted into the push pool for caching. Thereby, when the scene category satisfies the push conditions, the information is pushed based on the push pool.

Specifically, if the result shows that the push conditions are satisfied, all the messages are taken from the push pool and then issued to the user in a chronological order in which the messages are inputted into push pool, or in a priority order of the messages.

As for the process of pushing information according to the chronological order, if the scene category satisfies the push conditions, then chronological order information corresponding to the push information is obtained, the chronological order information being set based on a chronological order in which the push information is inputted into the push pool; and then the information is pushed based on the chronological order information.

As for the process of pushing information according to the priority order, if the scene category satisfies the push conditions, priority information corresponding to the push information is obtained, the priority information being set based on the type of the push information; and then the information is pushed based on the priority information, thereby ensuring the restoration degree of information pushing and the reach rate of information.

Figure 6:
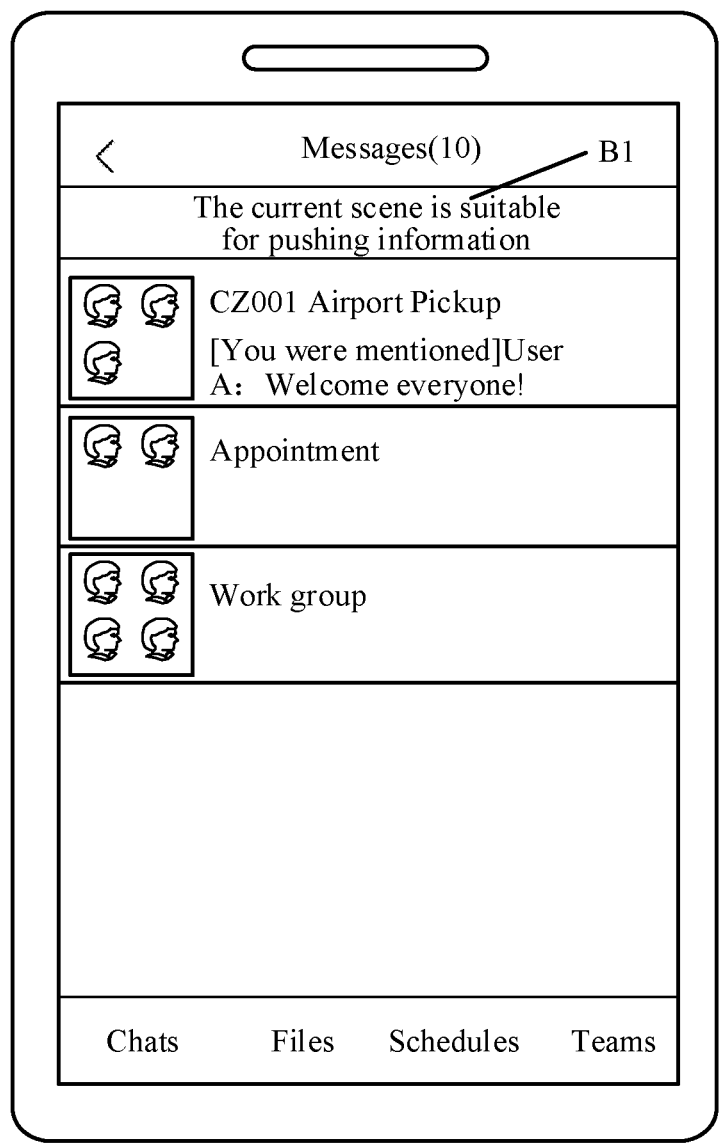
FIG. 6 is a schematic scene diagram of another information pushing method in a vehicle driving scene according to an embodiment of this disclosure.

Specifically, as shown in FIG. 6, FIG. 6 is a schematic scene diagram of another information pushing method in a vehicle driving scene provided by an embodiment of this disclosure. The figure shows a terminal interface "The current scene is suitable for pushing information" B 1. In this terminal interface, the messages are pushed according to the priority (with @) order. The specific pushing method may be voice reading, automatic interface display, or automatic enlargement of images and the like, which is not limited here.

It is to be understood that in order to save background resources of the terminal, the information volume corresponding to the push pool may also be detected. If the information volume reaches a preset value, the push information is pushed immediately, thereby ensuring the normal operation of the terminal device.

As can be seen from the above embodiment, if the push information in the vehicle driving scene is received, the driving scene image information collected by the in-vehicle image collection device is obtained, the driving scene image information is used for recording the corresponding environmental information of the vehicle in the vehicle driving scene, then the scene category identification information identified based on the driving scene image information can be obtained. Since the scene category identification information is used for indicating the category of the environmental information, if the scene category identification information satisfies the push conditions, then the push information is pushed in the vehicle driving scene. In this way, the scene where the driving object is located is identified, and further the information is pushed in a suitable scene. Therefore, the user can accurately perceive the pushed information, which greatly improves the information pushing efficiency, and moreover, the attention distracted by the pushed information will not affect the safety of the user during driving.

Some of the above embodiments have introduced the process of identifying the scene by using the in-vehicle vision assistant mounted in the terminal device in combination with the server. However, in the actual scene, the identification process of the model may also be performed on the terminal side, which may be a mobile terminal or an in-vehicle terminal.

In a scene, the in-vehicle device (which may be a mobile terminal or an in-vehicle terminal) is not adequate for performing model operations, such as having weak CPU performance. At this time, if the in-vehicle device can use some hardware to communicate with the server in the background of the network, the collected driving scene image information can be transmitted to the server for processing.

In addition, if the in-vehicle device is adequate for performing model operations, or has no hardware or is not adequate (such as data used up) to communicate with the server, then the second model is operated on the in-vehicle device to identify the driving scene image information to obtain the scene category identification information.

Correspondingly, if the in-vehicle device is adequate for operating the model and capable of communicating with the server through the network, the device for identifying the scene category identification information may be determined dynamically according to a preset rule. For example, when there is enough data and the latency is low, the driving scene image information may be uploaded as much as possible to the cloud server for processing and receive the processing result. When there is not enough data or the requirement for the accuracy of the model output is not high, the second model may be operated on the in-vehicle device to reduce the usage of data.

It is to be understood that via Bluetooth or wireless hotspots for connecting the mobile terminal and the in-vehicle terminal device, it may be determined that the mobile phone is near a known in-vehicle terminal, and the identification scene shown in FIG. 5 may be displayed in the mobile terminal or the in-vehicle terminal.

Figure 7:
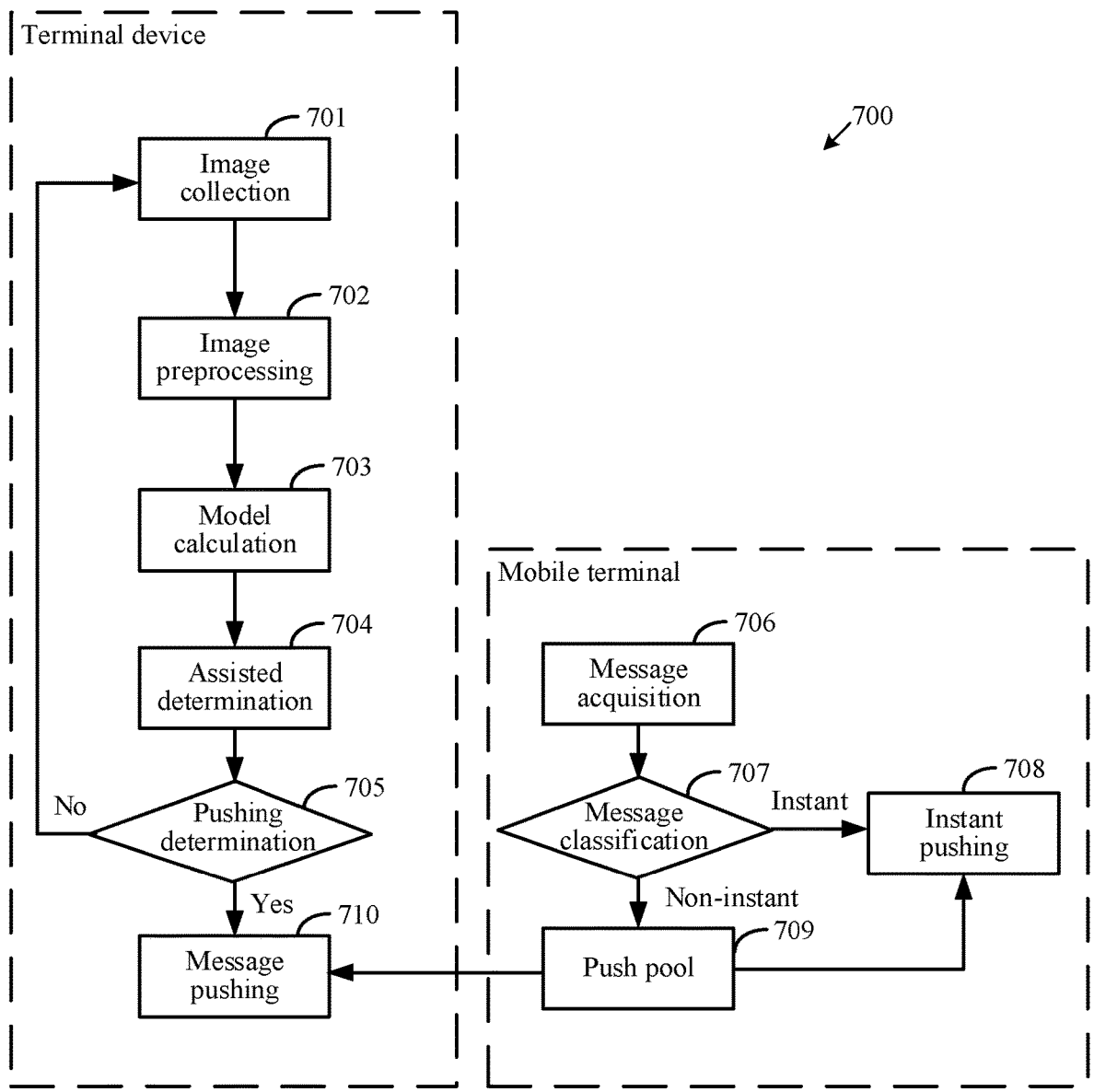
FIG. 7 is a flowchart of another information pushing method in a vehicle driving scene according to an embodiment of this disclosure.

The scenes in which the in-vehicle terminal and the mobile terminal respectively execute the information pushing solution of this disclosure will be described below. The in-vehicle terminal as the aforementioned terminal device corresponds to image collection and identification on the model side, and the mobile terminal may be connected with the in-vehicle terminal and corresponds to information receiving and pushing on the push side. The details are described below. Referring to FIG. 7, FIG. 7 is a flowchart of an information pushing method 700 in a vehicle driving scene provided by an embodiment of this disclosure. The method 700 provided by the embodiments of this disclosure at least includes the following steps:

701: Image collection.

In this embodiment, an in-vehicle terminal may collect the image through an in-vehicle image collection device. The in-vehicle image collection device is an in-vehicle image collection device that collects images of the environment near the vehicle at a certain frame rate. Here, the image collection device needs to be able to capture color images of the road with sufficient definition, the viewing angle cannot be too inclined downward or upward, and the focal length is as short as possible, so that a wider range of road information can be obtained.

702: Image preprocessing.

In this embodiment, the process of preprocessing the collected image by the in-vehicle terminal may include: for example, scale the collected image to use a smaller model that is more suitable to be mounted in the vehicle; or crop the collected image, such as crop out an engine cover and other areas unrelated to the air quality outside the vehicle; or enhance the collected image, such as increase the contrast, perform histogram equalization or normalization and the like.

Specifically, the above process of preprocessing the image may include steps of digitization, geometric transformation, normalization, smoothing, restoration and enhancement.

In terms of digitization, since the grayscale value of an image is a continuous function of a spatial variable (continuous values of a position), the grayscale value of the image can be sampled and quantized on an M×N lattice (classified as one of 2b gray levels), and a digital image that can be processed by a computer can be obtained. In order to make the digital image reconstruct the original image, there are certain requirements for the values of M, N and b. Within the spatial and grayscale resolution capabilities of a receiving apparatus, the larger the values of M, N, and b, the better the quality of the reconstructed image. When a sampling period is equal to or less than half of the minimum detail period in the original image, the spectrum of the reconstructed image is equal to that of the original image, so the reconstructed image can be exactly the same as the original image. Since the product of M, N and b determines the storage volume of an image in the computer, under the condition of a given storage volume, it is necessary to select appropriate values of M, N and b according to different properties of the image to obtain the best processing effect.

In terms of geometric transformation, it is a transformation used for correcting systematic errors of an image collection system and random errors of an instrument position. Systematic errors of a satellite image, such as distortions caused by earth rotation, the speed of a scanning mirror, map projection and other factors, can be represented by a model and eliminated by geometric transformation. Random errors, such as errors caused by changes in aircraft attitude and altitude, are difficult to be represented by a model. As a result, after the systematic errors are corrected, the observed image is compared with the image with known correct geometric position, and a certain number of ground control points in the image are used for solving the bivariate polynomial function group, so as to achieve the purpose of transformation.

In terms of normalization, it is an image standard form that makes certain features of an image invariant under a given transformation. Certain properties of an image, such as the area and perimeter of an object, are inherently invariant to coordinate rotation. Generally, the influence of certain factors or transformations on some properties of the image can be eliminated or attenuated by normalization, so that it can be selected as the basis for measuring the image. For example, for remote sensing images with uncontrollable illumination, normalization of gray histogram is necessary for image analysis. Grayscale normalization, geometric normalization and transformation normalization are three normalization methods to obtain the invariant properties of images.

In terms of smoothing, it is a technique for removing random noise in an image. The basic requirement for smoothing is to remove the noise without blurring image contours or lines. Commonly used smoothing methods include a median method, a local averaging method and a k-nearest neighbor averaging algorithm. The size of a local area may be fixed or may change with the grayscale value point by point. Besides, a spatial frequency domain band-pass filtering method is used sometimes.

In terms of restoration, it corrects the image degradation caused by various reasons, so that the reconstructed or estimated image is as close as possible to the ideal non-degraded image field. Image degradation often occurs in practical applications. For example, the disturbance of atmospheric flow, the aberration of an optical system, and the relative motion between a camera and an object will degrade the remote sensing image. The basic restoration technique is to regard an obtained degraded image $g(x, y)$ as the convolution of a degradation function $h(x, y)$ and an ideal image $f(x, y)$. Their Fourier transform satisfies the relationship of $G(u, v) = H(u, v)F(u, v)$. After the degradation function is determined according to the degradation mechanism, F(u, v) can be obtained from this relationship, and f(x, y) can be obtained by inverse Fourier transform. The restoration process is usually referred to as an inverse filter. In practical applications, since H(u, v) decreases rapidly as the distance from the origin of the uv plane increases, in order to avoid the enhancement of noise in a high frequency range, when u2+v2 is greater than a certain threshold value W, M(u, v) is made equal to 1. WO is selected to ensure that H(u, v) is not equal to zero in the range of u2+v2≤W. An algebraic method of image restoration is based on the optimum criterion of least squares. An estimate value is found to minimize the value of the goodness criterion function. With this simple method, the least squares Wiener filter can be derived. When there is no noise, the Wiener filter becomes an ideal inverse filter.

In terms of enhancement, information in the image is selectively enhanced and suppressed to improve the visual effect of the image, or the image is converted into a form more suitable for machine processing, so as to facilitate data extraction or identification. For example, an image enhancement system can highlight the contours of an image through a high-pass filter, so that the machine can measure the shape and perimeter of the contours. There are many methods for image enhancement. Contrast stretching, logarithmic transformation, density slicing, histogram equalization and the like can be used for changing the gray tone of the image and highlighting the details. In practical applications, it is often necessary to use different methods and repeat experiments to achieve satisfactory results.

It is to be understood that the above preprocessing methods may be used alone or in combination, and may be executed in a random order. The specific order and type are determined according to the actual scene and are not limited here.

Through the above image preprocessing, the driving scene image information to be inputted into a model is obtained.

703: Model calculation.

In this embodiment, the in-vehicle terminal performs model calculation by using a local second model or a preset model. The model calculation process includes: input the image into the above model, and the output contents of the model are detailed scenes shown in the captured content, such as traffic jam, cloudy day, rainy day, tunnel, underground parking lot and the like, or just a binary result (such as whether it is suitable for pushing messages).

Specifically, a process of model training includes training the preset model by using a scene and corresponding image features as a sample pair, and a corresponding pushing result may also be marked to facilitate the binary classification process.

In addition, for the process of model training, since there is a certain correlation among the images in the vehicle driving process, data enhancement may be performed during the training.

Specifically, in order to ensure the comprehensiveness of the training data, data enhancement may be performed, i.e., the data volume of relevant data in a dataset is increased to ensure uniform distribution of the samples. The reason for performing data enhancement is that road scenes may exist in different conditions, such as in different directions, positions, scales, brightness and the like, and these conditions can be solved by training the target identification model based on additionally synthesized data.

Specifically, the data enhancement process may adopt offline augmentation, which is suitable for smaller datasets. Eventually, the number of datasets will increase by a certain multiple, which is equal to the number of transformations. For example, flipping all the images is equivalent to multiplying the number of datasets by 2.

In addition, the data enhancement may also adopt online augmentation or augmentation on the fly, which is more suitable for larger datasets and can withstand explosive increase in scale. In addition, data may be transformed in mini batches before being inputted into the model. For example, when a machine learning framework supports online augmentation, acceleration may be performed using gpu.

704: Assisted determination.

In this embodiment, the assisted determination may be performed in conjunction with the driving parameters, such as vehicle speed, gear position, handbrake state and the like.

705: Pushing determination.

In this embodiment, based on the comprehensive determination of the scene identification and the driving parameters, it is determined that the information can be pushed in a non-driving scene.

706: Message acquisition.

In this embodiment, the messages obtained by the mobile terminal may be messages transmitted by a plurality of applications, and may be a set of all messages that may affect the driving process.

707: Message classification.

In this embodiment, a process of classifying the messages includes determine whether the messages need to be pushed instantly or not. The information that needs to the pushed instantly may be navigation information or safety prompt information. The specific information type may be adjusted according to the settings of the user.

708: Instant pushing.

In this embodiment, the messages that need to be pushed instantly are pushed immediately, so as to ensure the normal operation of the driving process.

709: Push pool.

In this embodiment, the messages that do not need to be pushed instantly, namely, messages that can be pushed later, may be stored in the push pool. If there are too many messages in the push pool or the storage time of some messages exceeds a set value, the superfluous or time-out messages will be pushed immediately.

710: Message pushing.

In this embodiment, the messages are pushed through the in-vehicle terminal, for example, through a loudspeaker or interface display of the in-vehicle terminal.

According to the above embodiment, when the user is heavily burdened in driving, non-urgent messages (messages that do not need to be pushed instantly) will not be pushed. Such messages will be pushed only when the user is less burdened in driving, so that the user has more time to view the pushed content, which makes the push more efficient.

Figure 8:
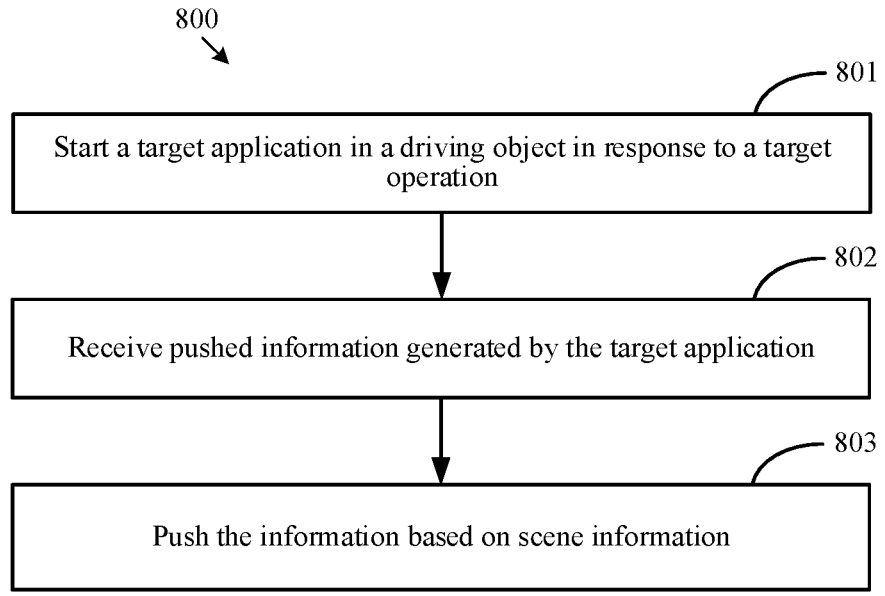
FIG. 8 is a flowchart of another information pushing method for virtual applications according to an embodiment of this disclosure.

In a scene, the start of every virtual application in the in-vehicle scene is associated with the terminal device, so as to interact with the applications. This scene will be described below. Referring to FIG. 8, FIG. 8 is a flowchart of an information pushing method 800 for virtual applications provided by an embodiment of this disclosure. The method 800 provided by the embodiments of this disclosure at least includes the following steps:

801: Start a target application in a driving object in response to a target operation.

Figure 9:
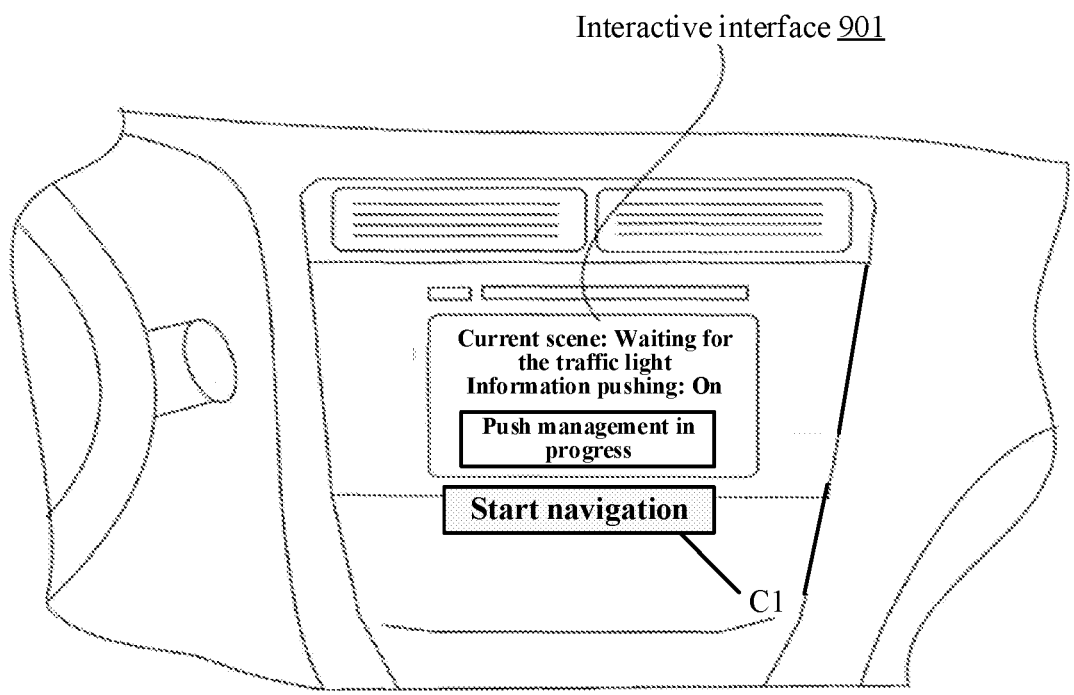
FIG. 9 is a schematic scene diagram of another information pushing method for virtual applications according to an embodiment of this disclosure.

In this embodiment, the target operation may be a start operation on the in-vehicle navigation. As shown in FIG. 9, FIG. 9 is a schematic scene diagram of an information pushing method for virtual applications provided by an embodiment of this disclosure. The figure shows a start key Cl on the in-vehicle navigation. After the user clicks/taps the start key Cl, the scene information will be identified, and the related identification result will be displayed on the interactive interface 901.

In addition, after the target application is started, the function of virtual elements for information playback is associated with the background scene identification process, that is, the playback permission is occupied. In this case, firstly, an application interface corresponding to the target application is started in response to the target operation. Then, the virtual elements for information playback in the application interface are associated with the terminal device in the driving object, so as to start the target application.

Figure 10:
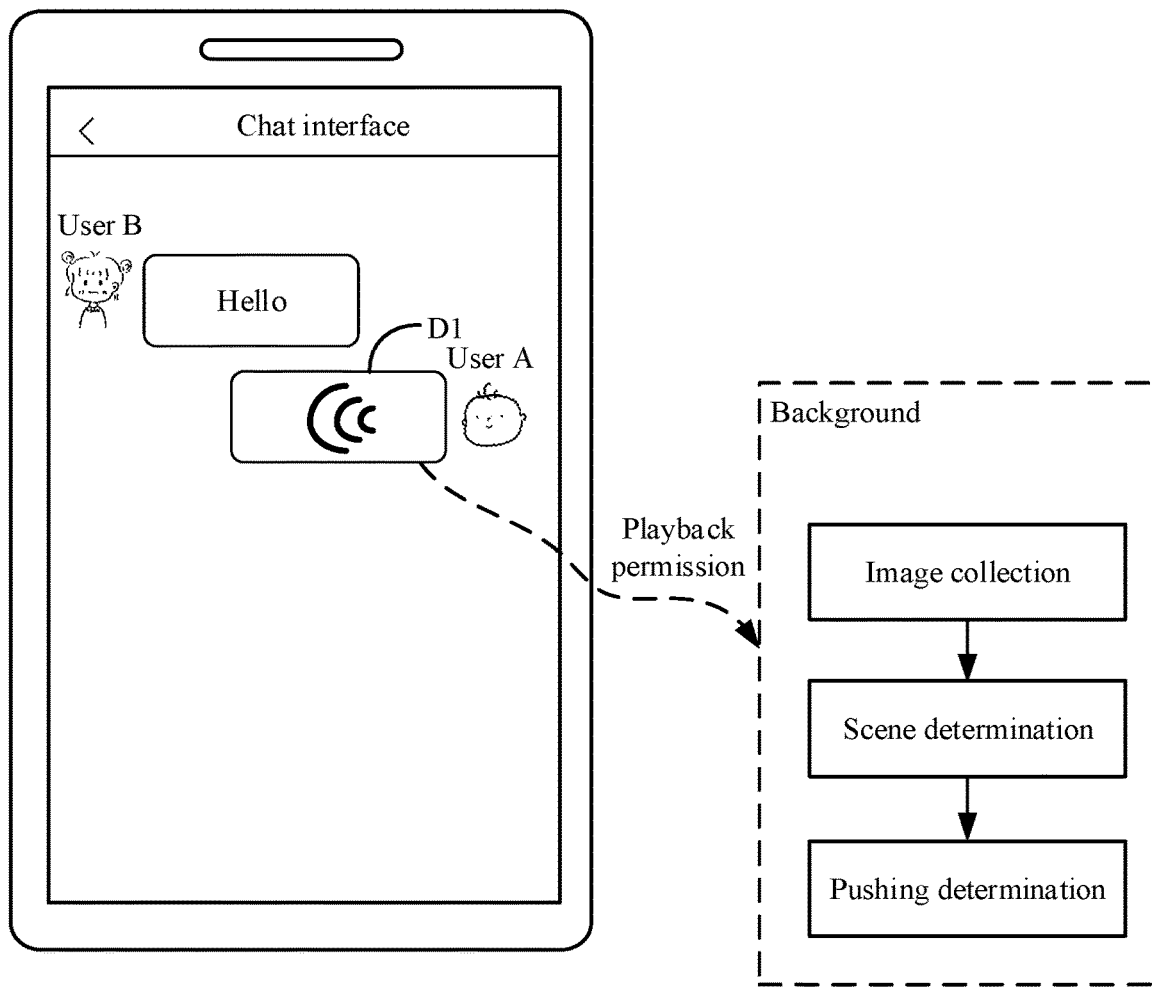
FIG. 10 is a schematic scene diagram of another information pushing method for virtual applications according to an embodiment of this disclosure.

Specifically, as shown in FIG. 10, FIG. 10 is a schematic scene diagram of another information pushing method for virtual applications provided by an embodiment of this disclosure. The figure shows a voice push D1. However, the playback function of the voice push D1 is occupied by the in-vehicle vision assistant. The playback function will be aroused only after the scene identification is performed in the in-vehicle vision assistant and the determination on whether to push or not is completed.

802: Receive pushed information generated by the target application.

In this embodiment, the target application operates normally, but the function of information playback is occupied by the in-vehicle vision assistant.

803: Push the information based on the scene information.

In this embodiment, for the process of pushing the information, reference can be made to the embodiment shown in FIG. 3 or FIG. 7.

In this disclosure, deep learning is used for identifying the images captured by the in-vehicle camera, so as to classify the current vehicle driving environment, and the permissions of related applications are managed to control the interaction process applied to the user, so that the messages and services are pushed together when the driver at driving is able to process information unrelated to driving, thereby reducing the burden of the driver and improving the message and service pushing efficiency.

Figure 11:
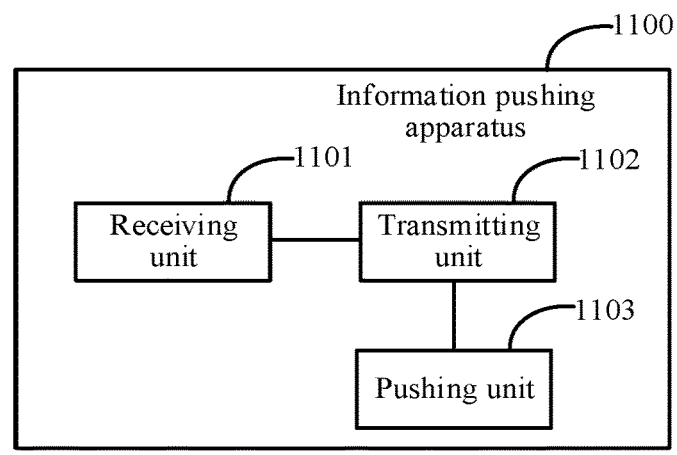
FIG. 11 is a schematic structural diagram of an information pushing apparatus according to an embodiment of this disclosure.

In order to better implement the above solutions of the embodiments of this disclosure, a related apparatus for implementing the above solutions is also provided below. Referring to FIG. 11, FIG. 11 is a schematic structural diagram of an information pushing apparatus provided by an embodiment of this disclosure. An information pushing apparatus 1100 includes:

a receiving unit 1101, configured to receive push information in a vehicle driving scene;

the receiving unit 1101 being further configured to obtain driving scene image information collected by an in-vehicle image collection device, the driving scene image information being used for recording corresponding environmental information of a vehicle in the vehicle driving scene;

the receiving unit 1101 being further configured to obtain scene category identification information identified based on the driving scene image information, the scene category identification information being used for indicating a category of the environmental information; and a pushing unit 1103, configured to push, when the scene category identification information satisfies push conditions, the push information in the vehicle driving scene.

In some implementations, the receiving unit 1101 is further configured to:

transmit the driving scene image information to a server such that the server identifies the driving scene image information to obtain the scene category identification information; and receive the scene category identification information transmitted by the server, the scene category identification information being used for indicating the category of the environmental information.

In some implementations, the receiving unit 1101 is specifically configured to transmit collection parameters to the in-vehicle image collection device in response to a target instruction such that the in-vehicle image collection device performs image collection according to the collection parameters to obtain a collected image, the collection parameters being adapted to different driving scenes.

The receiving unit 1101 is specifically configured to receive the collected image transmitted by the in-vehicle image collection device, and preprocess the collected image to determine a driving object element in the collected image.

The receiving unit 1101 is specifically configured to determine a pixel range corresponding to the driving object element and crop the pixel range to obtain a cropped image.

The receiving unit 1101 is specifically configured to adjust parameters of the cropped image based on scene features of the driving scene to obtain the driving scene image information.

In some implementations, a transmitting unit 1102 is specifically configured to obtain network resource information in real time.

The transmitting unit 1102 is specifically configured to transmit, when network status information satisfies preset conditions, the driving scene image information to the server such that the server inputs the driving scene image information to a first model and identifies the driving scene image information to obtain the scene category identification information.

In some implementations, the scene category identification information is determined based on an attribution probability, the attribution probability is determined according to a target item in a scene score sequence for indicating attribution probabilities of a plurality of preset scenes, and the scene score sequence is obtained by inputting the driving scene image information into the first model through the server.

In some implementations, the transmitting unit 1102 is specifically configured to call, when the network status information does not satisfy the preset conditions, a second model to extract local features from the driving scene image information to obtain feature elements, the second model consuming less computing resources than the first model.

The transmitting unit 1102 is specifically configured to perform identification based on the feature elements to obtain a feature category.

The transmitting unit 1102 is specifically configured to determine the scene category identification information according to scene information corresponding to the feature category.

In some implementations, the pushing unit 1103 is specifically configured to gather, when the scene category identification information satisfies the push conditions, statistics on driving parameters of the vehicle in a time preset period.

The pushing unit 1103 is specifically configured to determine push parameters based on numerical fluctuations corresponding to the driving parameters.

The pushing unit 1103 is specifically configured to generate a push sequence list according to the push parameters to push the push information based on the push sequence list.

In some implementations, the pushing unit 1103 is specifically configured to obtain a scene category set outputted by the first model within a preset time period, the scene category set being a plurality of pieces of historical scene category identification information outputted by the first model within the preset time period.

The pushing unit 1103 is specifically configured to gather statistics on category distribution information of scene categories identified by the plurality of pieces of historical scene category identification information in the scene category set.

The pushing unit 1103 is specifically configured to update the scene category identification information based on an extreme value item in the category distribution information.

In some implementations, the pushing unit 1103 is specifically configured to obtain, in response to receiving the push information in the vehicle, an information type corresponding to the push information.

The pushing unit 1103 is specifically configured to input, when the information type indicates that the push information is non-instant information, the push information into a push pool for caching.

The pushing unit 1103 is specifically configured to push, when the scene category identification information satisfies the push conditions, the information based on the push pool.

In some implementations, the pushing unit 1103 is specifically configured to obtain, when the scene category identification information satisfies the push conditions, chronological order information corresponding to the push information, the chronological order information being set based on a chronological order in which the push information is inputted into the push pool.

The pushing unit 1103 is specifically configured to generate a push sequence based on the chronological order information to push the push information.

In some implementations, the pushing unit 1103 is specifically configured to obtain priority information corresponding to the push information, the priority information being set based on the type of the push information.

The pushing unit 1103 is specifically configured to update the push sequence based on a push level corresponding to the priority information.

The pushing unit 1103 is further configured to push the push information based on the updated push sequence.

In some implementations, the pushing unit 1103 is specifically configured to obtain the information type corresponding to the push information.

The pushing unit 1103 is specifically configured to push, when the information type indicates that the push information is information that needs to be pushed instantly, the push information immediately.

The push information in the vehicle driving scene is received; then the driving scene image information collected by the in-vehicle image collection device is obtained, the driving scene image information being used for recording corresponding environmental information of the vehicle in the vehicle driving scene; the driving scene image information is transmitted to the server such that the server identifies the driving scene image information to obtain the scene category identification information; further, the scene category identification information transmitted by the server is received, the scene category identification information being used for indicating the category of the environmental information; and when the scene category identification information satisfies the push conditions, the push information is pushed in the vehicle driving scene. In this way, the intelligent information pushing process based on the driving environment is realized. Since the scene where the driving object is located is identified by using the preset model and then the information is pushed in the suitable scene, the user can accurately perceive the pushed information, which greatly improves the information pushing efficiency and also improves the safety when the information is pushed during driving.

Figure 12:
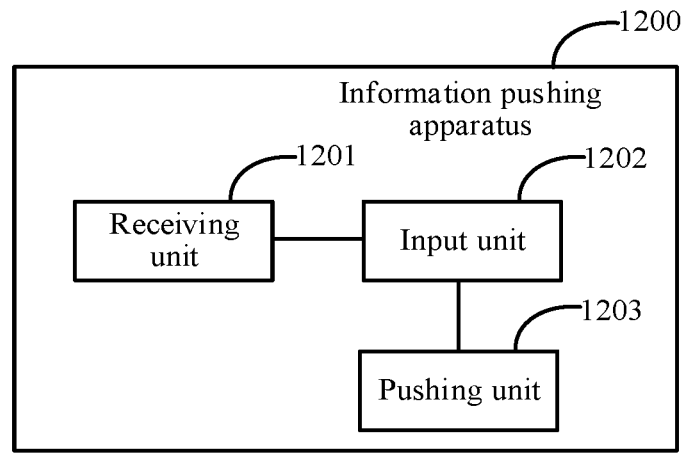
FIG. 12 is a schematic structural diagram of an information pushing apparatus for virtual applications according to an embodiment of this disclosure.

An embodiment of this disclosure further provides an information pushing apparatus for virtual applications. Referring to FIG. 12, FIG. 12 is a schematic structural diagram of an information pushing apparatus for virtual applications provided by an embodiment of this disclosure. An interaction apparatus 1200 includes:

a receiving unit 1201, configured to receive push information in a vehicle driving scene;

the receiving unit 1201 being further configured to obtain driving scene image information collected by an in-vehicle image collection device;

an input unit 1202, configured to input the driving scene image information into a preset model to identify the driving scene image information to obtain scene category identification information; and a pushing unit 1203, configured to push, when the scene category identification information satisfies push conditions, the push information in the vehicle driving scene.

Figure 13:
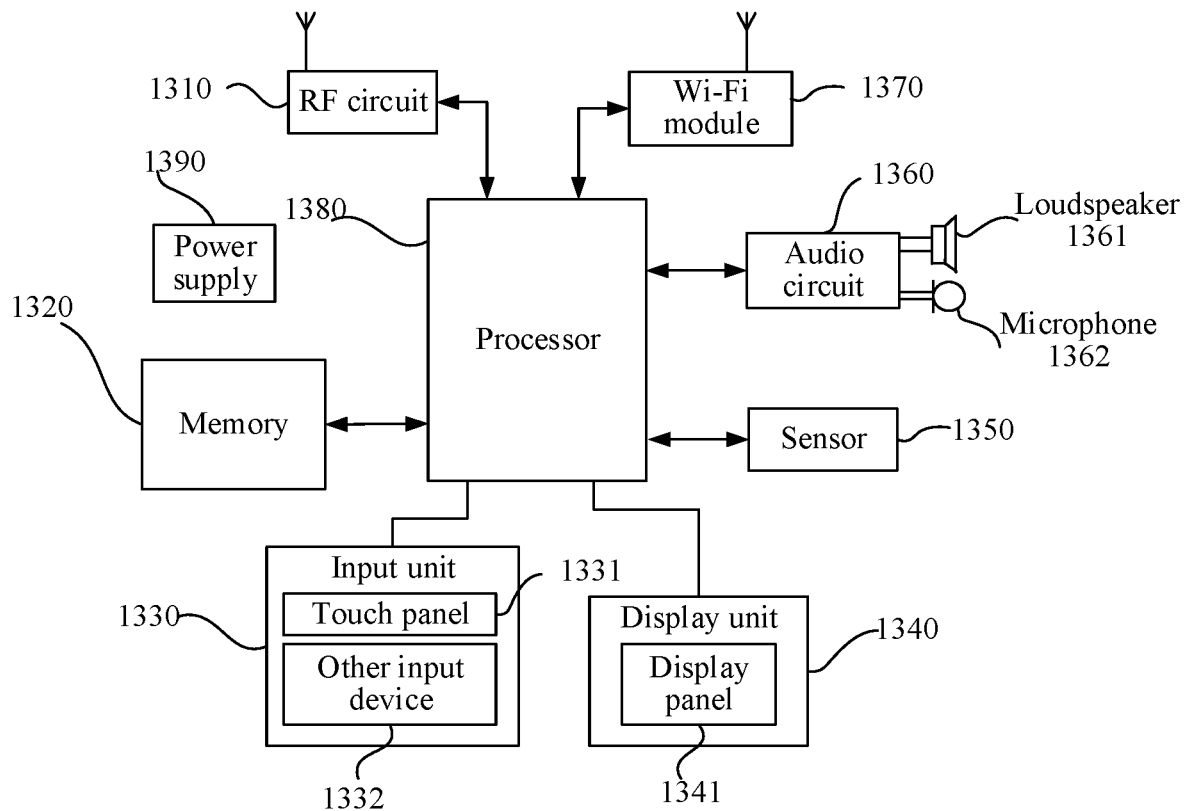
FIG. 13 is a schematic structural diagram of a terminal device according to an embodiment of this disclosure.

An embodiment of this disclosure further provides a terminal device. FIG. 13 is a schematic structural diagram of another terminal device according to an embodiment of this disclosure. For ease of description, only parts related to the embodiments of this disclosure are shown. For specific technical details that are not disclosed, reference may be made to the method part in the embodiments of this disclosure. The terminal may be any terminal device including a mobile phone, a tablet computer, a personal digital assistant (PDA), a point of sales (POS), an on-board computer and the like, and the terminal being a mobile phone is used as an example:

FIG. 13 is a block diagram of a part of a structure of the mobile phone related to the terminal according to this embodiment of this disclosure. Referring to FIG. 13, the mobile phone includes components such as: a radio frequency (RF) circuit 1310, a memory 1320, an input unit 1330, a display unit 1340, a sensor 1350, an audio circuit 1360, a wireless fidelity (Wi-Fi) module 1370, a processor 1380, and a power supply 1390. A person skilled in the art may understand that the structure of the mobile phone shown in FIG. 13 does not constitute a limitation on the mobile phone, and the mobile phone may include more components or fewer components than those shown in the figure, or some components may be combined, or a different component deployment may be used.

The following makes a specific description of components of the mobile phone with reference to FIG. 13.

The RF circuit 1310 may be configured to receive and send a signal in an information receiving and sending process or a call process, and in particular, after downlink information of a base station is received, send the downlink information to the processor 1380 for processing. In addition, The RF circuit sends uplink data to the base station.

The memory 1320 may be configured to store a software program and module. The processor 1380 runs the software program and module stored in the memory 1320, to implement various functional applications and data processing of the mobile phone.

The input unit 1330 may be configured to receive inputted digit or character information, and generate a keyboard signal input related to the user setting and function control of the mobile phone. Specifically, the input unit 1330 may include a touch panel 1331 and another input device 1332.

The display unit 1340 may be configured to display information inputted by the user or information provided for the user, and various menus of the mobile phone. The display unit 1340 may include a display panel 1341. In some implementations, the display panel 1341 may be configured by using a liquid crystal display (LCD), an organic light-emitting diode (OLED), or the like.

The mobile phone may further include at least one sensor 1350 such as an optical sensor, a motion sensor, and other sensors.

The audio circuit 1360, a loudspeaker 1361, and a microphone 1362 may provide audio interfaces between a user and the mobile phone. The audio circuit 1360 may transmit, to the loudspeaker 1361, an electrical signal obtained by converting received audio data, and the loudspeaker 1361 converts the electrical signal into a voice signal for outputting. In addition, the microphone 1362 converts a collected sound signal into an electrical signal. After receiving the electrical signal, the audio circuit 1360 converts the electrical signal into audio data, and then outputs the audio data. After processed by the processor 1380, the audio data is transmitted through the RF circuit 1310 to, for example, another mobile phone or the audio data is outputted to the memory 1320 for further processing.

Wi-Fi belongs to a short distance wireless transmission technology. The mobile phone may help, by using the Wi-Fi module 1370, a user to receive and transmit an email, browse a web page, access stream media, and the like. This provides wireless broadband Internet access for the user.

The processor 1380 is a control center of the mobile phone, and is connected to various parts of the entire mobile phone by using various interfaces and lines. By running or executing a software program and/or module stored in the memory 1320, and invoking data stored in the memory 1320, the processor executes various functions of the mobile phone and performs data processing.

In the embodiments of this disclosure, the processor 1380 included in the terminal further has the function of performing the steps of the information pushing method in a vehicle driving scene.

Figure 14:
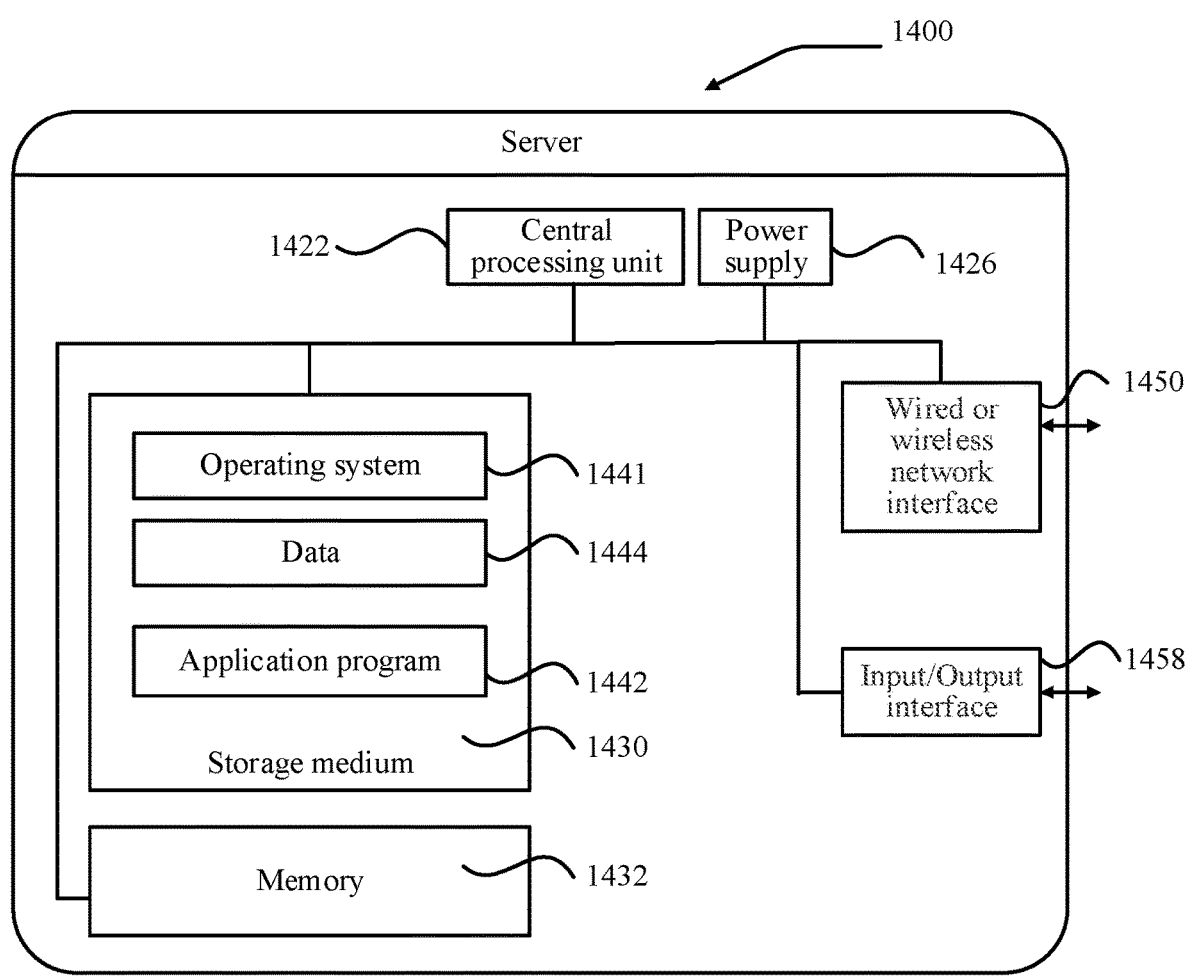
FIG. 14 is a schematic structural diagram of a server according to an embodiment of this disclosure.

An embodiment of this disclosure further provides a server. Referring to FIG. 14, FIG. 14 is a schematic structural diagram of a server according to an embodiment of this disclosure. The server 1400 greatly differs due to different configurations or performances. The server may include one or more central processing units (CPUs) 1422 (for example, one or more processors) and a memory 1432, one or more store application programs 1442 or storage media 1430 of data 1444 (for example, one or more mass storage devices). The memory 1432 and the storage medium 1430 may perform transient storage or permanent storage. The program stored in the storage medium 1430 may include one or more modules (not marked in the figure), and each module may include a series of instruction operations to the server. Further, the CPU 1422 may be configured to communicate with the storage medium 1430 to perform the series of instruction operations in the storage medium 1430 on the server 1400.

Here, the term module (and other similar terms such as unit, submodule, etc.) may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module. A module is configured to perform functions and achieve goals such as those described in this disclosure, and may work together with other related modules, programs, and components to achieve those functions and goals.

The server 1400 may further include one or more power supplies 1426, one or more wired or wireless network interfaces 1450, one or more input/output interfaces 1458, and/or one or more operating systems 1441, for example, Windows Server™, Mac OSX™, Unix™, Linux™, or Free-BSD™.

The steps performed by the information pushing apparatus in the foregoing embodiment may be based on the server structure shown in FIG. 14.

An embodiment of this disclosure further provides a computer-readable storage medium. The computer-readable storage medium stores an information pushing instruction in a vehicle driving scene. When the instruction runs on a computer, the computer is caused to perform the steps performed by the information pushing apparatus in the method described according to the embodiments shown in FIG. 3 to FIG. 10.

An embodiment of this disclosure further provides a computer program product including information pushing instructions in a vehicle driving scene, the computer program product, when run on a computer, causing the computer to perform the steps performed by the information pushing apparatus in the method described according to the embodiments shown in FIG. 3 to FIG. 10.

An embodiment of this disclosure further provides an information pushing system in a vehicle driving scene, the information pushing system in a vehicle driving scene may include the information pushing apparatus in the embodiment described in FIG. 11, the information pushing apparatus for virtual applications in the embodiment described in FIG. 12, the terminal device in the embodiment described in FIG. 13, or the server described in FIG. 14.

A person skilled in the art may clearly understand that, for the purpose of convenient and brief description, for a detailed working process of the system, apparatus, and unit described above, reference may be made to a corresponding process in the method embodiments.

In the several embodiments provided in this disclosure, it is to be understood that the disclosed system, apparatus, and method may be implemented in other manners. For example, the described apparatus embodiments are only exemplary. For example, the division of the units is only a logical function division and may be other divisions during actual implementation. For example, a plurality of units or components may be combined or integrated into another system, or some features may be ignored or not performed. In addition, the shown or discussed mutual couplings or direct couplings or communication connections may be implemented through some interfaces. The indirect couplings or communication connections between the apparatus or units may be implemented in electronic, mechanical, or other forms.

The units described as separate parts may or may not be physically separate. Parts displayed as units may or may not be physical units, and may be located in one position, or may be distributed on a plurality of network units. Some or all of the units may be selected according to actual needs to achieve the objectives of the solutions of the embodiments.

In addition, functional units in the embodiments of this disclosure can be integrated into one processing unit, or each of the units can exist alone physically, or two or more units are integrated into one unit. The integrated unit may be implemented in the form of hardware, or may be implemented in the form of a software function unit.

When the integrated unit is implemented in the form of a software functional unit and sold or used as an independent product, the integrated unit may be stored in a computer-readable storage medium. Based on such an understanding, the technical solutions of this disclosure essentially, or the part contributing to the related technology, or all or some of the technical solutions may be implemented in a form of a software product. The computer software product is stored in a storage medium and includes a plurality of instructions for instructing a computer device (which may be a personal computer, an information pushing apparatus, or a network device) to perform all or some of the steps of the methods described in the embodiments of this disclosure. The foregoing storage medium includes: any medium that can store program code, such as a USB flash drive, a removable hard disk, a ROM, a RAM, a magnetic disk, a compact disc, or the like.

The foregoing embodiments are merely intended for describing the technical solutions of this disclosure, but not for limiting this disclosure. Although this disclosure is described in detail with reference to the foregoing embodiments, it is to be appreciated by a person skilled in the art that, modifications may still be made to the technical solutions described in the foregoing embodiments, or equivalent replacements may be made to the part of the technical features; as long as such modifications or replacements do not cause the essence of corresponding technical solutions to depart from the spirit and scope of the technical solutions of the embodiments of this disclosure.

What is claimed is:

1. An information pushing method in a vehicle driving scene, executed by a terminal device, the method comprising:
   receiving push information in the vehicle driving scene;
   obtaining driving scene image information collected by an in-vehicle image collection device, the driving scene image information being for recording corresponding environmental information of a vehicle in the vehicle driving scene;
   identifying scene category identification information based on the driving scene image information, the scene category identification information being for indicating a category of the environmental information;
   refraining from pushing the push information in the vehicle driving scene until the scene category identification information satisfies a push condition;
   obtaining, in response to the scene category identification information satisfying the push condition, chronological order information corresponding to the push information, the chronological order information being set based on a chronological order in which the push information is inputted into a push pool;
   generating a push sequence based on the chronological order information to push the push information;
   obtaining priority information corresponding to the push information;
   updating the push sequence based on a push level corresponding to the priority information; and
   pushing the push information based on the updated push sequence.

2. The method according to claim 1, wherein the identifying the scene category identification information based on the driving scene image information comprises:
   transmitting the driving scene image information to a server such that the server identifies the driving scene image information to obtain the scene category identification information; and
   receiving the scene category identification information from the server, the scene category identification information being for indicating the category of the environmental information.

3. The method according to claim 1, wherein the obtaining the driving scene image information comprises:
   transmitting collection parameters to the in-vehicle image collection device in response to a target instruction such that the in-vehicle image collection device performs image collection according to the collection parameters to obtain a collected image, the collection parameters being adapted to different driving scenes;
   receiving the collected image from the in-vehicle image collection device, and preprocessing the collected image to determine a driving object element in the collected image;
   determining a pixel range corresponding to the driving object element and cropping the pixel range to obtain a cropped image; and
   adjusting parameters of the cropped image based on scene features of the driving scene to obtain the driving scene image information.

4. The method according to claim 2, wherein the transmitting the driving scene image information to the server such that the server identifies the driving scene image information to obtain the scene category identification information comprises:
   obtaining network resource information in real time; and
   transmitting, in response to network status information satisfying a preset condition, the driving scene image information to the server such that the server inputs the driving scene image information to a first model and identifies the driving scene image information to obtain the scene category identification information.

5. The method according to claim 4, wherein the scene category identification information is determined based on an attribution probability, the attribution probability being determined according to a target item in a scene score sequence for indicating attribution probabilities of a plurality of preset scenes, and the scene score sequence being obtained by the server inputting the driving scene image information into the first model.

6. The method according to claim 4, further comprising:
   utilizing, in response to the network status information failing to satisfy the preset condition, a second model to extract local features from the driving scene image information to obtain feature elements, the second model consuming less computing resources than the first model;

identifying a feature category based on the feature elements; and
determining the scene category identification information according to scene information corresponding to the feature category.

7. The method according to claim 1, further comprising:
collecting, in response to the scene category identification information satisfying the push condition, driving parameters of the vehicle in a preset time period;
determining push parameters based on numerical fluctuations corresponding to the driving parameters; and
generating a push sequence list according to the push parameters to push the push information based on the push sequence list.

8. The method according to claim 1, further comprising:
obtaining a scene category set outputted by a first model within a preset time period, the scene category set being a plurality of pieces of historical scene category identification information outputted by the first model within the preset time period;
collecting category distribution information of scene categories, the scene categories being identified by the plurality of pieces of historical scene category identification information from the scene category set; and
updating the scene category identification information based on an extreme value item in the category distribution information.

9. The method according to claim 1, further comprising:
obtaining, in response to receiving the push information in the vehicle driving scene, an information type corresponding to the push information; and
inputting, in response to the information type indicating that the push information is non-instant information, the push information into a push pool for caching.

10. The method according to claim 1, further comprising:
obtaining an information type corresponding to the push information; and
pushing, in response to the information type indicating that the push information is instant push information, the push information immediately.

11. The method according to claim 1, wherein the scene category identification information comprises a driving environment category and a weather environment category, and the scene category identification information satisfying the push condition comprises a scene where the driving environment category indicates that the vehicle is in safe driving or a weather scene where the weather environment category indicates that the vehicle driving is not affected.

12. An information pushing apparatus in a vehicle driving scene, comprising:
a memory operable to store computer-readable instructions; and
a processor circuitry operable to read the computer-readable instructions, the processor circuitry when executing the computer-readable instructions is configured to:
receive push information in the vehicle driving scene;
obtain driving scene image information collected by an in-vehicle image collection device, the driving scene image information being for recording corresponding environmental information of a vehicle in the vehicle driving scene;
identify scene category identification information based on the driving scene image information, the scene category identification information being for indicating a category of the environmental information; and
refrain from pushing the push information in the vehicle driving scene until the scene category identification information satisfies a push condition;
obtain, in response to the scene category identification information satisfying the push condition, chronological order information corresponding to the push information, the chronological order information being set based on a chronological order in which the push information is inputted into a push pool;
generate a push sequence based on the chronological order information to push the push information;
obtain priority information corresponding to the push information;
update the push sequence based on a push level corresponding to the priority information; and
push the push information based on the updated push sequence.

13. The apparatus according to claim 12, wherein the processor circuitry is configured to:
transmit the driving scene image information to a server such that the server identifies the driving scene image information to obtain the scene category identification information; and
receive the scene category identification information from the server, the scene category identification information being for indicating the category of the environmental information.

14. The apparatus according to claim 12, wherein the processor circuitry is configured to:
transmit collection parameters to the in-vehicle image collection device in response to a target instruction such that the in-vehicle image collection device performs image collection according to the collection parameters to obtain a collected image, the collection parameters being adapted to different driving scenes;
receive the collected image from the in-vehicle image collection device, and preprocess the collected image to determine a driving object element in the collected image;
determine a pixel range corresponding to the driving object element and crop the pixel range to obtain a cropped image; and
adjust parameters of the cropped image based on scene features of the driving scene to obtain the driving scene image information.

15. The apparatus according to claim 12, wherein the processor circuitry is configured to:
collect, in response to the scene category identification information satisfying the push condition, driving parameters of the vehicle in a preset time period;
determine push parameters based on numerical fluctuations corresponding to the driving parameters; and
generate a push sequence list according to the push parameters to push the push information based on the push sequence list.

16. The apparatus according to claim 12, wherein the processor circuitry is further configured to:
obtain a scene category set outputted by a first model within a preset time period, the scene category set being a plurality of pieces of historical scene category identification information outputted by the first model within the preset time period;
collect category distribution information of scene categories, the scene categories being identified by the plurality of pieces of historical scene category identification information from the scene category set; and update the scene category identification information based on an extreme value item in the category distribution information.

17. The apparatus according to claim 12, wherein the processor circuitry is further configured to:
   obtain, in response to receiving the push information in the vehicle driving scene, an information type corresponding to the push information;
   input, in response to the information type indicating that the push information is non-instant information, the push information into a push pool for caching; and
   push, in response to the scene category identification information satisfying the push conditions, the push information based on the push pool.

18. A non-transitory machine-readable media, having instructions stored on the machine-readable media, the instructions configured to, when executed, cause a machine to:
   receive push information in a vehicle driving scene;
   obtain driving scene image information collected by an in-vehicle image collection device, the driving scene image information being for recording corresponding environmental information of a vehicle in the vehicle driving scene;
   identify scene category identification information based on the driving scene image information, the scene category identification information being for indicating a category of the environmental information; and
   refrain from pushing the push information in the vehicle driving scene until the scene category identification information satisfies a push condition;
   obtain, in response to the scene category identification information satisfying the push condition, chronological order information corresponding to the push information, the chronological order information being set based on a chronological order in which the push information is inputted into a push pool;
   generate a push sequence based on the chronological order information to push the push information;
   obtain priority information corresponding to the push information;
   update the push sequence based on a push level corresponding to the priority information; and
   push the push information based on the updated push sequence.

* * * * *